US010945002B2

(12) United States Patent
Yang et al.

(10) Patent No.: US 10,945,002 B2
(45) Date of Patent: Mar. 9, 2021

(54) MULTIMEDIA PLAYBACK METHOD AND RELATED DEVICE

(71) Applicant: Tencent Technology (Shenzhen) Company Limited, Shenzhen (CN)

(72) Inventors: Ying Yang, Shenzhen (CN); Siming Mo, Shenzhen (CN); Yi Yan, Shenzhen (CN); Kai Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 35 days.

(21) Appl. No.: 16/006,100

(22) Filed: Jun. 12, 2018

(65) Prior Publication Data

US 2018/0295397 A1  Oct. 11, 2018

Related U.S. Application Data

(63) Continuation of application No. PCT/CN2017/085043, filed on May 19, 2017.

(30) Foreign Application Priority Data

May 25, 2016 (CN) .......................... 201610355142.9

(51) Int. Cl.
*H04N 21/234* (2011.01)
*H04N 21/2668* (2011.01)
(Continued)

(52) U.S. Cl.
CPC ... *H04N 21/23424* (2013.01); *H04N 21/2668* (2013.01); *H04N 21/4222* (2013.01); (Continued)

(58) Field of Classification Search
None
See application file for complete search history.

(56) References Cited

U.S. PATENT DOCUMENTS

| 9,490,998 | B1 * | 11/2016 | Danciu | ............... H04L 12/2825 |
| 2004/0250272 | A1 * | 12/2004 | Durden | .................. H04N 7/163 |
| | | | | 725/25 |

(Continued)

FOREIGN PATENT DOCUMENTS

| CN | 1737853 A1 | 2/2006 |
| CN | 101127867 A | 2/2008 |

(Continued)

OTHER PUBLICATIONS

English translation of International Search Report, issued in International Application No. PCT/CN2017/085043, dated Jul. 28, 2017, pp. 1-2, State Intellectual Property Office of the P.R. China, Beijing, China.

(Continued)

*Primary Examiner* — Jason K Lin
(74) *Attorney, Agent, or Firm* — Brinks Gilson & Lione

(57) ABSTRACT

System and methods for multimedia playback are provided. A terminal device may obtain a playback identifier of a multimedia playback device. The terminal device may send an association request to a server based on the playback identifier. The association request may enable the server to establish an association between a terminal device and the multimedia playback device. The terminal device may receive a plurality of candidate options pushed by the server. The plurality of candidate options may be pushed to the terminal device associated with the multimedia playback device when the server detects that a preset time point arrives after the multimedia playback device plays back a first media resource. The terminal device may obtain a target option selected from the plurality of candidate options. The terminal device may feedback the target option to the server to enable the server to determine a second media resource to be played back by the multimedia playback device.

16 Claims, 8 Drawing Sheets

(51) Int. Cl.
*H04N 21/475* (2011.01)
*H04N 21/422* (2011.01)
*H04N 21/472* (2011.01)
*H04N 21/4223* (2011.01)

(52) U.S. Cl.
CPC ... *H04N 21/4758* (2013.01); *H04N 21/47217* (2013.01); *H04N 21/4223* (2013.01)

(56) References Cited

U.S. PATENT DOCUMENTS

| | | | |
|---|---|---|---|
| 2006/0064733 A1 | 3/2006 | Norton et al. | |
| 2007/0028272 A1* | 2/2007 | Lockton | H04H 20/38 725/62 |
| 2008/0098417 A1* | 4/2008 | Hatamian | H04H 60/33 725/24 |
| 2008/0148312 A1 | 6/2008 | Ren | |
| 2008/0282286 A1* | 11/2008 | Or | H04H 60/33 725/34 |
| 2009/0300143 A1* | 12/2009 | Musa | H04N 21/41407 709/218 |
| 2011/0296506 A1* | 12/2011 | Caspi | H04N 21/4227 726/6 |
| 2012/0229588 A1* | 9/2012 | Greenfield | H04N 21/25891 348/14.04 |
| 2012/0280907 A1* | 11/2012 | Masaki | H04N 21/4122 345/156 |
| 2013/0042262 A1* | 2/2013 | Riethmueller | H04N 7/17318 725/14 |
| 2014/0053182 A1* | 2/2014 | Jaager | H04N 21/41415 725/25 |
| 2014/0214920 A1* | 7/2014 | Wong | H04L 51/04 709/203 |
| 2014/0325561 A1* | 10/2014 | Allen | H04N 21/2393 725/38 |
| 2014/0337900 A1* | 11/2014 | Hurley | H04N 21/812 725/87 |
| 2015/0082333 A1* | 3/2015 | Belton | H04H 20/38 725/24 |
| 2016/0212178 A1* | 7/2016 | Zhang | H04L 65/4015 |
| 2016/0366464 A1* | 12/2016 | Rouady | H04N 21/4312 |
| 2017/0078275 A1* | 3/2017 | Slovetskiy | H04L 63/0807 |
| 2017/0182406 A1* | 6/2017 | Castiglia | G06K 9/00778 |
| 2017/0289629 A1* | 10/2017 | Zhou | H04L 29/06 |

FOREIGN PATENT DOCUMENTS

| | | |
|---|---|---|
| CN | 102955651 A | 3/2013 |
| CN | 103645801 A | 3/2014 |
| CN | 104410914 A | 3/2015 |
| CN | 104469445 A | 3/2015 |
| CN | 104754419 A | 7/2015 |
| CN | 105302416 A | 2/2016 |
| CN | 105898394 A | 8/2016 |

OTHER PUBLICATIONS

International Search Report and Written Opinion with English translation dated Jul. 28, 2017 for PCT Application No. PCT/CN2017/085043, 12 pages.
Office Action with concise English translation dated Nov. 5, 2018 for Chinese Application No. 201610355142.9, 7 pages.
Office Action with concise English translation dated Jan. 29, 2019 for Chinese Application No. 201610355142.9, 6 pages.

* cited by examiner ized numerals designate corresponding parts throughout the different views.

MULTIMEDIA PLAYBACK METHOD AND RELATED DEVICE

CROSS REFERENCE TO RELATED APPLICATIONS

This application is a continuation of International Application PCT/CN2017/085043, entitled "MULTIMEDIA PLAYBACK METHOD AND RELATED DEVICE", filed May 19, 2017, which claims priority to Chinese Patent Application No. 201610355142.9 filed on May 25, 2016, both of which are incorporated herein by reference in their entirety.

TECHNICAL FIELD

This application relates to the field of media playback technologies, and in particular, to a multimedia playback method and related devices.

BACKGROUND

In multimedia distribution, a multimedia playback device may receive a multimedia resource via a distribution medium, such as the Internet. Interactions between the multimedia playback device, the source of multimedia resource, and/or other multimedia devices may be limited.

SUMMARY

This disclosure may generally relate to the following aspects. In a first aspect, a terminal device may obtain a playback identifier of a multimedia playback device. The terminal device may send an association request to a server based on the playback identifier. The association request may enable the server to establish an association between the terminal device and the multimedia playback device. The terminal device may receive a plurality of candidate options pushed by the server. The plurality of candidate options may be pushed to the terminal device associated with the multimedia playback device when the server detects that a preset time point arrives after the multimedia playback device plays back a first media resource. The terminal device may obtain a target option selected from the plurality of candidate options. Terminal may feedback the target option to the server to enable the server to determine a second media resource to be played back by the multimedia playback device.

In a second aspect, a server may allocate a playback identifier to a multimedia playback device. The server may receive an association request initiated by at least one terminal device according to the playback identifier, and establishing an association between the multimedia playback device and the at least one terminal device. The server may synchronously push, when it is detected that a preset time point arrives after the multimedia playback device plays back a first media resource, a plurality of candidate options to the at least one terminal device associated with the multimedia playback device. The server may obtain a target option selected by the at least one terminal device from the plurality of candidate options, and determine, according to the target option, a second media resource to be played back by the multimedia playback device.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

While various embodiments are described below, it will be apparent to those of ordinary skill in the art that many more embodiments and implementations are possible. Accordingly, the embodiments described herein are examples, not the only possible embodiments and implementations.

Present approaches to mainstream multimedia playback primarily may use a form that a viewer passively receives information (playback content). The viewer may not participate too much in the playback content. For example, when a user views a movie in a theater, the user may not participate in the story trend and the ending arrangement, but, instead, passively receive the story content.

One technical advancement of the system, methods, and apparatuses described herein may be that a viewer may control a multimedia playback and increase a sense of participation of the user in the multimedia playback.

In the embodiments of this application, a client may be installed and operated in a terminal device. The terminal device may include but is not limited to a tablet computer, a mobile phone, a personal digital assistant (PDA), an e-reader, a notebook computer, a smart television, a vehicle terminal and other intelligent devices.

In the embodiments of this application, a multimedia playback device may be a computer, a network television, a theater video playback device, or the like.

A first media resource and a second media resource of the embodiments of this application may be associated. For example, the first media resource and the second media resource both belong to a target media resource, and the second media resource may be one story branch of the first media resource. For example, the target media resource may be a movie, and then the second media resource may be one story development branch preset by a playwright based on the first media resource.

Alternatively, a first media resource and a second media resource of the embodiments of this application may not be associated. For example, the first media resource may be a movie, and the second media resource may be another movie; or the first media resource may be a video, and the second media resource may be audio.

The multimedia playback method of the embodiments of this application may be applied to the field of Internet video playback. For example, in a theater or a small exhibition, when users hand-hold terminals to view an Internet video, to better participate in an interaction of the video playback, the users may use the terminals to participate in the interaction of the video playback.

Figure 2:
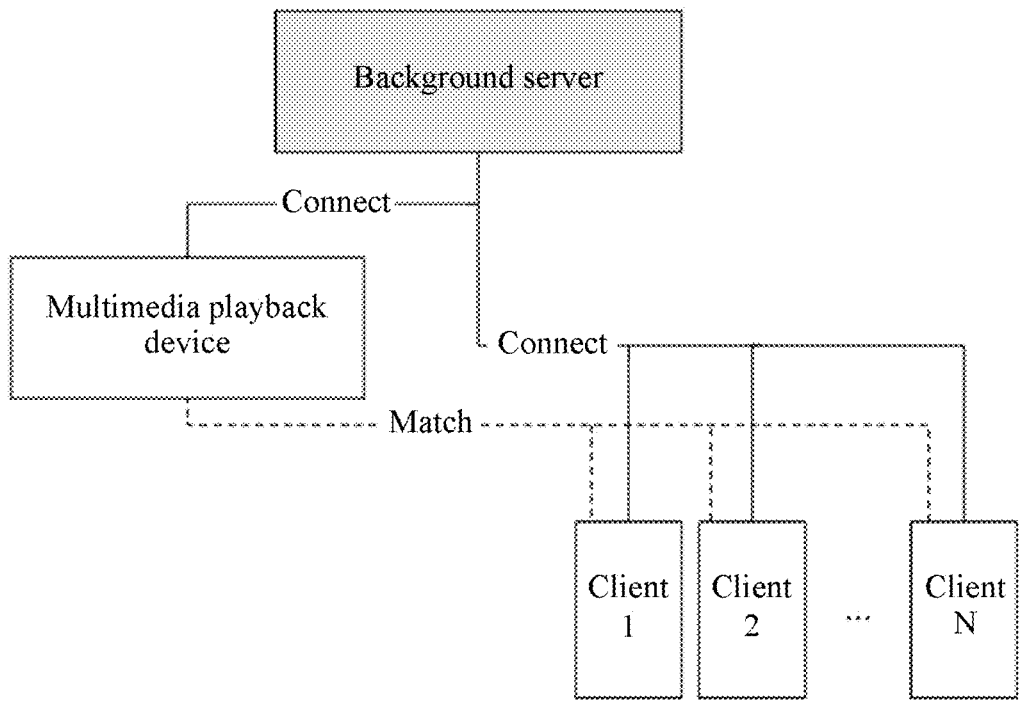
FIG. 2 illustrates an example of an architecture diagram of a multimedia playback system according to an embodiment of this application.

FIG. 2 illustrates an example of an architecture diagram of a multimedia playback system according to an embodiment of this application. As shown in this figure, the system includes a server, a multimedia playback device, and at least one client (terminal). The multimedia playback device establishes a network connection with the server, the at least one client also establishes a connection with the server, and the multimedia playback device may establish an association with the at least one client by using a playback identifier. Herein, the client may be an APP that can perform the method of this application and that runs in the terminal, and a service module that can perform the method of this application and that corresponds to the client also runs in the server. When a client establishes a connection with the server, the server module in the server may record information such as an identifier of the client, and can provide a corresponding application service according to a service request from the client. When establishing an association between a multimedia playback device and the client (that is, a terminal), the server may associate a playback identifier allocated to the multimedia playback device with the identifier of the client, or may further associate the playback identifier with information such as an identifier of the terminal on which the client is, so as to establish the association between the two by using the playback identifier.

The following describes the multimedia playback method provided in the embodiments of this application in details with reference to FIG. 1 to FIG. 5.

Figure 1:
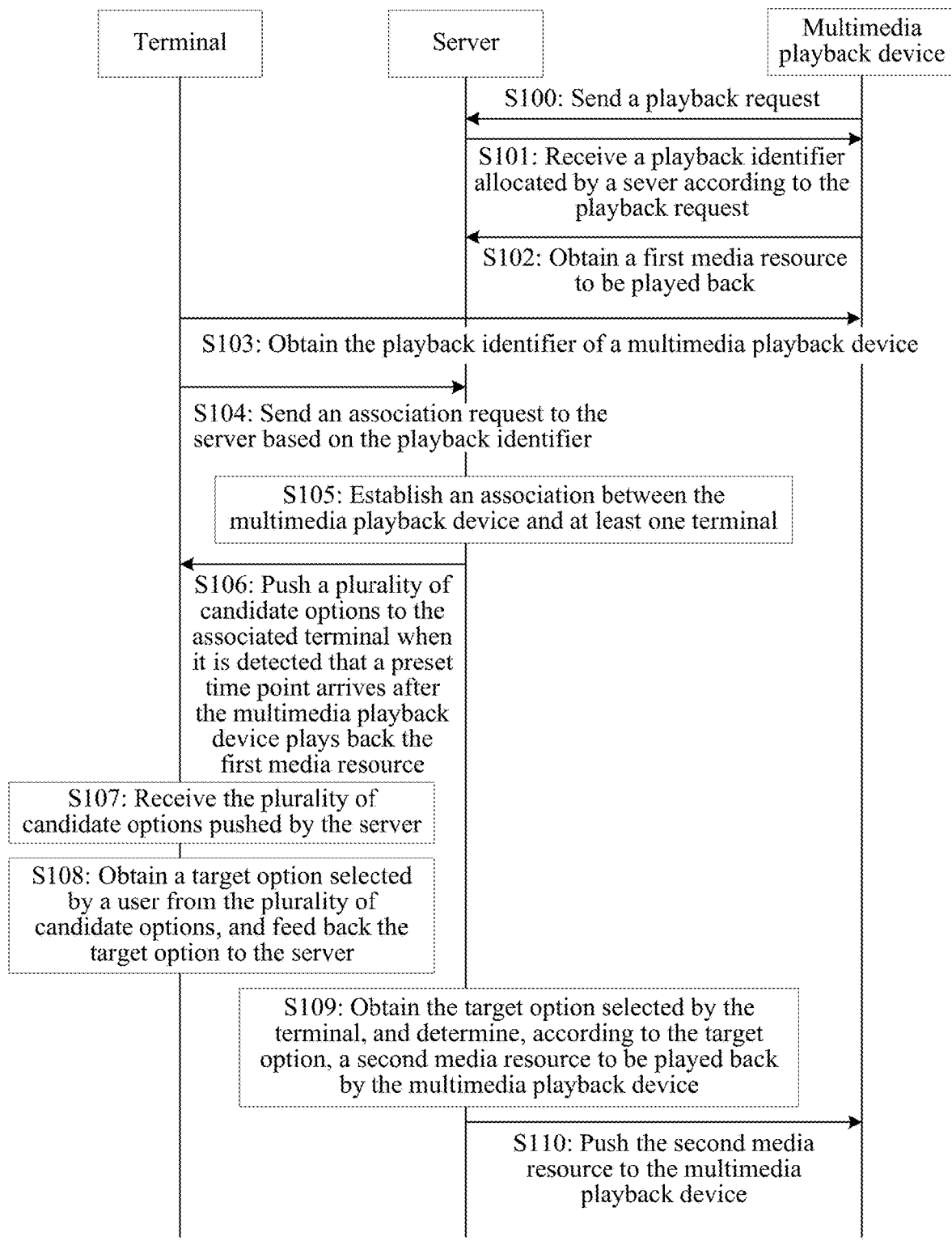
FIG. 1 illustrates an example of a flowchart of a multimedia playback method according to an embodiment of this application.

FIG. 1 illustrates an example of a flowchart of a multimedia playback method according to an embodiment of this application. A terminal in this embodiment of this application may be a terminal hand-hold by any user viewing an Internet video playback in a preset space. A process of the multimedia playback method shown in this embodiment includes the following step S100 to step S110.

Step S100: A multimedia playback device sends a playback request to a server, and receives a playback identifier allocated by the server according to the playback request.

In this embodiment of this application, the multimedia playback device may be an Internet video playback device, for example, a video playback device in a theater. When needing to play back a first media resource, the multimedia playback device sends the playback request to the server by using Internet, the playback request carrying a resource identifier of the first media resource. For example, if the first media resource belongs to a plot of a movie, the resource identifier may be a name of the movie.

Step S101: The server allocates the playback identifier to the multimedia playback device.

In this embodiment of this application, the server allocates a playback identifier for each playback of the multimedia playback device, and the playback identifier is used to uniquely identify a first media resource that currently needs to be played back by the multimedia playback device. It needs to be noted that the playback identifier may be generated in real time, and is uniquely determined according to the multimedia playback device and the first media resource that is currently played back. That is, when a same media resource is played back on different multimedia playback devices, generated playback identifiers are different; and when a same multimedia playback device plays back different media resources, generated playback identifiers are also different. When the playback identifier is learned, the first media resource that is currently played back by the multimedia playback device may be located. The playback identifier is a globally unique identifier, and may be obtained according to a preset algorithm.

In some embodiments, the allocating the playback identifier to the multimedia playback device may include the following three steps.

Step 1: Receive a multimedia playback request sent by the multimedia playback device.

Step 2: Generate the playback identifier for the multimedia playback device in real time according to the multimedia playback request.

Step 3: Return the playback identifier to the multimedia playback device.

In this embodiment of this application, when starting playing back a new media resource each time, the multimedia playback device submits the multimedia playback request to the server, and performs time synchronization with the server. In some embodiments, the multimedia playback request carries an identifier (for example, a name of a movie) of a first media resource to be played back by the multimedia playback device and an identifier of the multimedia playback device. After receiving the multimedia playback request, the server returns a globally unique playback identifier playback id according to the multimedia playback request, and the playback identifier playback id may be obtained in real time according to a preset algorithm. Herein, the media resource to be played back is a media resource that is ready to be played back, that is prepared for a playback (briefly referred to as pre-playback), or that is to be played back.

In some embodiments, the server further simultaneously provides a corresponding playback instruction (including the first media resource to be played back by the multimedia playback device) and an interaction instruction (including a preset time point for interacting with a plurality of users, and a plurality of candidate options associated with the preset time point) for the multimedia playback device.

After obtaining all the related instructions, the multimedia playback device formally starts playing back. As used herein, the terms "Playing back" or "play back" may include displaying an identified video content and/or video stream. Alternatively or in addition, "playing back" or "play back" may include streaming an identified video content or video stream. In some embodiments, the multimedia playback device also generates the playback id into a two-dimensional barcode, and displays the two-dimensional barcode on a playback interface. Each user may hand-hold the terminal to scan the two-dimensional barcode to obtain the playback identifier. It may be understood that the playback identifier may alternatively be notified to each user in another manner. For example, when the playback identifier is a string of characters, the playback identifier is broadcast by using a language. This is not limited herein.

Step S102: The multimedia playback device obtains a first media resource to be played back, a preset time point corresponding to the first media resource, and a plurality of candidate options associated with the preset time point.

In this embodiment of this application, after receiving the playback request of the multimedia playback device, the server also returns the first media resource to be played back by the multimedia playback device to the multimedia playback device, and feeds back the preset time point of an interaction corresponding to the first media resource and the plurality of candidate options associated with the preset time point to the multimedia playback device.

Figure 3:
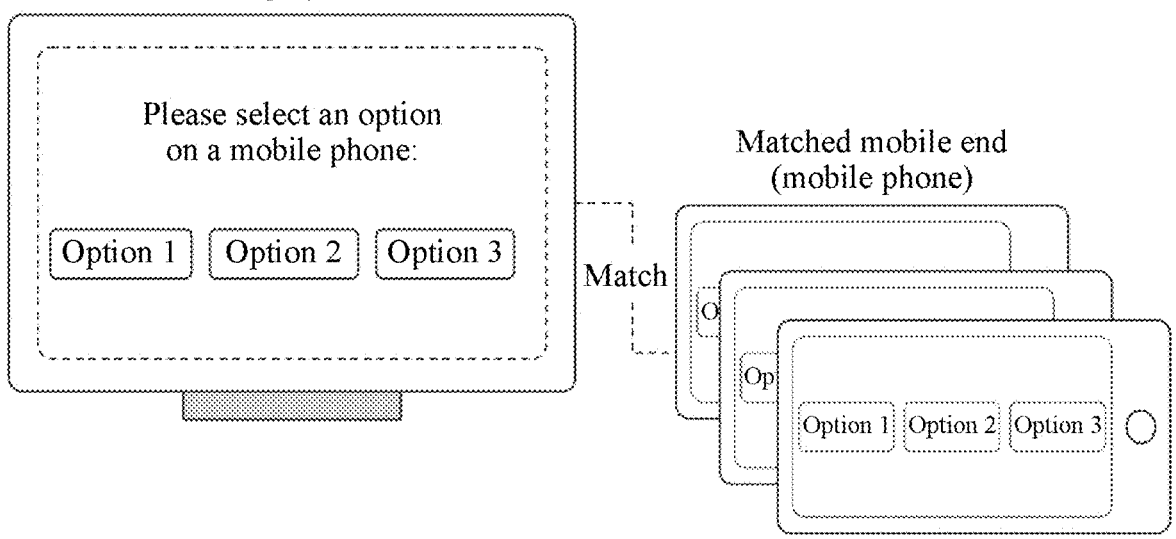
FIG. 3 illustrates an example of a display diagram of interaction between a playback end and a mobile phone end according to an embodiment of this application.

In this embodiment of this application, the multimedia playback device starts playing back the first media resource, and displays the plurality of candidate options when the preset time point arrives after beginning playing back the first media resource. As shown in FIG. 3, the multimedia playback device displays "option 1", "option 2" and "option 3".

Step S103: A terminal obtains the playback identifier of the multimedia playback device.

In this embodiment of this application, the terminal may be a terminal hand-hold by a user viewing an Internet video playback in a preset space (for example, a theater). A client of the terminal obtains the playback identifier of the multimedia playback device. In some embodiments, an obtaining method may include a plurality of methods. For example, the user may scan a graphic code including the playback identifier by using the terminal, and parses the graphic code to obtain the playback identifier of the multimedia playback device. The graphic code may be generated by the multimedia playback device according to the playback identifier, and is displayed on the playback interface.

Step S104: The terminal sends an association request to the server based on the playback identifier, to enable the server to establish an association between the terminal and the multimedia playback device.

In this embodiment of this application, the terminal sends the association request to the server based on the playback identifier, and performs time synchronization with the server. After receiving the association request, the server parses out the playback identifier, so as to establish the association between the terminal and the multimedia playback device according to the playback identifier. The playback identifier is generated by means of requesting the server in advance by the multimedia playback device.

Step S105: The server receives the association request initiated by at least one terminal according to the playback identifier, and establishes the association between the multimedia playback device and the at least one terminal.

In this embodiment of this application, after each terminal learned the playback identifier, to establish a matching association relationship with the playback device, each terminal sends the association request to the server according to the playback identifier, and performs time calibration with the server. The server receives the association request sent by the at least one terminal and parses out the playback identifier in the association request, and establishes the association between the multimedia playback device and the at least one terminal according to the playback identifier, that is, establishes a virtual connection between the multimedia playback device and the at least one terminal according to the playback identifier, so as to synchronize the multimedia playback device with the at least one terminal.

Step S106: The server pushes the plurality of candidate options to the at least one terminal when detecting that the preset time point arrives after the multimedia playback device plays back the first media resource.

In this embodiment of this application, when the preset time point arrives after the multimedia playback device plays back the first media resource, an interaction opportunity is given to the users, that is, a plurality of users mutually selects a media resource to be played back next.

In some embodiments, when the server detects that the preset time point arrives, to synchronize the multimedia playback device with the at least one terminal, the server synchronously pushes the plurality of candidate options to the at least one terminal. In some embodiments, when the preset time point arrives, the multimedia playback device also displays the plurality of candidate options. In a process of viewing the first media resource, when viewing that the multimedia playback device displays the plurality of candidate options, the user performs a selection operation on the terminal. As shown in FIG. 3, the multimedia playback device displays three candidate options, namely, "option 1", "option 2" and "option 3", and a matched terminal (mobile phone) also synchronously displays the three options.

The plurality of candidate options is options that are provided to the user to determine a media resource to be played back next by the multimedia playback device, and one candidate option corresponds to one preset media resource. For example, the first media resource is a fragment of a movie, and the fragment describes that "C selects to save who when A and B fall into the water", and then two candidate options, namely, "save A" and "save B" are generated. The two candidate options respectively correspond to different stories. Therefore, when a different target option is selected, a second media resource to be played back by the multimedia playback device is different. It needs to be noted that a correspondence between a candidate option and a preset media resource is stored in the server, and one candidate option corresponds to one preset media resource.

In some embodiments, as described above, the first media resource and the second media resource may be associated, that is, in a same media file; or may not be associated, that is, in independent different media files. The first media resource and the second media resource may be different media files, or may be different media file fragments (or segments) belonging to a same media file. When the first media resource and the second media resource are associated, that is, in a same media file, the second media resource may be media files or media file fragments that correspond to the plurality of candidate options and that can be started playing back at different time points. In this case, the plurality of candidate options correspond to media files or media file fragments that are of a target media resource and that are started playing back at different time points. In this way, the different time points may be used to identify different plots. For example, when a preset time point of 1 minute arrives after the first media resource is played back, options occur on the first media resource in the target media resource that is played back by the multimedia playback device. In this case, if more viewers select the option 1, it is determined that the second media resource to be played back by the multimedia playback device is a media file or a media file fragment that corresponds to the option 1 and starts at 1 minute 20 seconds, and the multimedia playback device jumps to the media file or the media file fragment that is started playing back from the 1 minute 20 seconds. If more viewers select the option 2, it is determined that the second media resource to be played back by the multimedia playback device is a media file or a media file fragment that corresponds to the option 2 and starts at 2 minutes 39 seconds, and the multimedia playback device jumps to the 2 minutes 39 seconds to start playing back. The first media resource and the second media resource in this embodiment of this application are only used to distinguish different content in the media resources.

Further, when the preset time point arrives after the first media resource is played back, and the user does not select the plurality of candidate options, the first media resource and the second media resource are not played back in chronological order, but the playback is end when the preset time point arrives. This is related to a specific plot arrangement.

Step S107: The terminal receives the plurality of candidate options pushed by the server, the plurality of candidate options being triggered to be pushed to the terminal associated with the multimedia playback device when the server detects that the preset time point arrives after the multimedia playback device plays back the first media resource.

Figure 5:
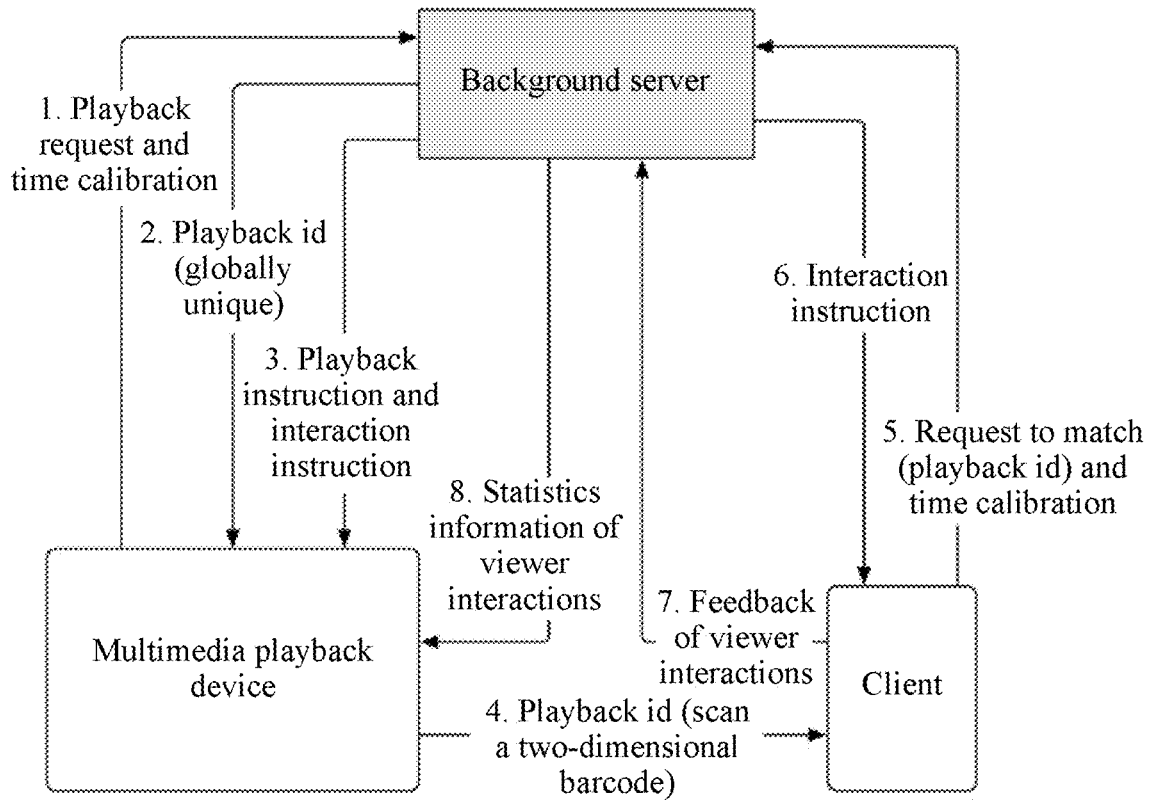
FIG. 5 illustrates an example of a diagram of information exchange according to an embodiment of this application.

In this embodiment of this application, when detecting that the preset time point arrives after the multimedia playback device plays back the first media resource, the server pushes the plurality of candidate options to the terminal. After receiving the plurality of candidate options, the terminal displays the plurality of candidate options, and the user may perform the selection operation on the plurality of candidate options. As shown in FIG. 5, the terminal displays "option 1", "option 2", and "option 3".

Step S108: The terminal obtains a target option selected by a user from the plurality of candidate options, and feeds back the target option to the server, to enable the server to determine a second media resource to be played back by the multimedia playback device.

In this embodiment of this application, the terminal obtains the target option selected by the user, and feeds back the target option to the server by using a network connection. It needs to be noted that an interaction time is limited, and the user needs to select the target option before the interaction time arrives. The server may determine, according to the target option selected by each terminal, the second media resource to be played back.

In some embodiments, after the terminal receives the plurality of candidate options pushed by the server, step S10 is included.

Step S10: Display the plurality of candidate options.

The obtaining a target option selected from the plurality of candidate options includes:

detecting an interactive operation performed by the user on the plurality of candidate options, and determining, according to the interactive operation, the target option selected by the user.

Specifically, the terminal may be a touchscreen terminal. The user may perform selection on the plurality of candidate options by using a touchscreen operation, and the target option selected by the user is determined according to a position of the touchscreen operation.

It may be understood that the interactive operation may be performing selection on the plurality of candidate options in a key input manner or a mouse input manner.

Step S109: The server obtains the target option selected by the at least one terminal from the plurality of candidate options, and determines, according to the target option, the second media resource to be played back by the multimedia playback device.

In this embodiment of this application, after each terminal in the at least one terminal receives the plurality of candidate options, the user may perform selection on the plurality of candidate options on the terminal, and return the selected target option to the server. The server obtains the target option fed back by each terminal in the at least one terminal, and determines, according to the target option, the second media resource to be played back by the multimedia playback device. It needs to be noted that the second media resource may be associated with the first media resource, or may not be associated with the first media resource.

In some embodiments, the determining, according to the target option, the second media resource to be played back by the multimedia playback device may include the following step S11 and step S12.

Step S11: Count a selection percentage of each selected target option according to the number of selection times of the target option respectively selected by the at least one terminal, the selection percentage of each target option being a percentage of the number of selection times of the target option in the total number of selection times of all target options. Specifically, when the interaction time arrives, the server may count a selection percentage of each candidate option in the plurality of candidate options according to the target option selected by each terminal. For example, ten terminals in total are matched and associated with the multimedia playback device, three terminals select the option 1, two terminals select the option 2, and five terminals select the option 3, and then a selection percentage of the option 1 is 30%, a selection percentage of the option 2 is 20%, and a selection percentage of the option 3 is 50%.

Step S12: Determine a preset media resource corresponding to a target option with the highest selection percentage in the plurality of candidate options as the second media resource to be played back by the multimedia playback device.

Specifically, the preset media resource corresponding to the target option with the highest selection percentage in the plurality of candidate options is determined as the second media resource to be played back by the multimedia playback device. Generally, one candidate option corresponds to one preset media resource. The foregoing options are still used as an example for description. The percentage of the option 3 is the highest in the three options, that is, a preset media resource corresponding to the option 3 is used as the second media resource to be played back.

Step S110: Push a selection percentage of each candidate option in the plurality of candidate options and the second media resource to the multimedia playback device.

In this embodiment of this application, to enable the viewers to obtain an overall percentage situation, the server pushes the selection percentage of each candidate option to the multimedia playback device, and the multimedia playback device displays the percentage. For example, the server may push multiple graphical indicators for the candidate options, the graphical indicators indicative of a corresponding rank for each candidate option. The serve may receive selection operations corresponding to the candidate options from one or more multimedia playback device. In some examples, the server may adjust the corresponding rank for at least one of the candidate options and redisplay the candidate options based on the adjusted corresponding rank for the at least one of the candidate options.

Figure 4:
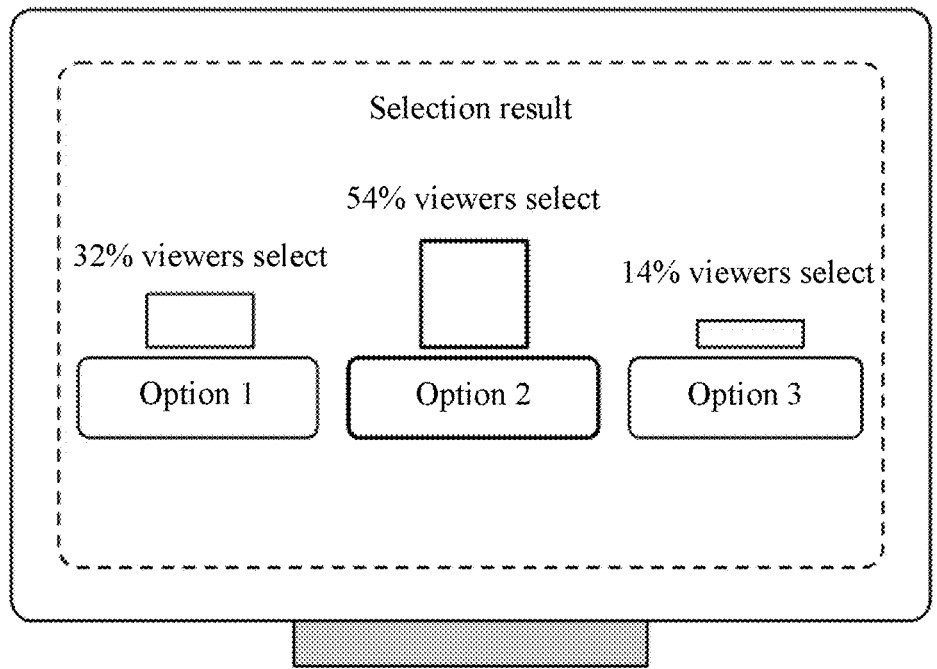
FIG. 4 illustrates an example of a diagram of an interaction result displayed by a player according to an embodiment of this application.

As shown in FIG. 4, FIG. 4 is a schematic diagram of a selection percentage of each candidate option displayed by the multimedia playback device. In addition, the server pushes the second media resource to be played back by the multimedia playback device to the multimedia playback device. The second media resource is determined according to the target option and then the second media resource is pushed to the multimedia playback device, so that a data buffer size of the multimedia playback device may be reduced.

It may be understood that as long as a buffer of the multimedia playback device is large enough, all the preset media resources corresponding to the foregoing candidate options may alternatively be pushed to the multimedia playback device in advance. When determining the second media resource to be played back, the server may send a resource identifier of the second media resource to the multimedia playback device, and the multimedia playback device plays back the second media resource according to the resource identifier.

In addition, if the server does not receive the association request sent by any terminal, that is, no user participates in the interaction process, after beginning playing back the first media resource, the multimedia playback device uses a preset default media resource as the media resource to be played back next by the multimedia playback device, and pushes the default media resource to the multimedia playback device for playing back.

In addition, if the server receives the association request sent by at least one terminal, but the server does not receive, in an interaction time period starting form the preset time point, the target option that is sent by any terminal and that is determined for the plurality of candidate options, that is, a user performs association matching by using the terminal, but no user performs the selection operation on the terminal, after playing back the first media resource, the multimedia playback device uses the preset default media resource as the media resource to be played back next by the multimedia playback device, and pushes the default media resource to the multimedia playback device for playing back.

This embodiment of this application includes: obtaining a playback identifier of a multimedia playback device; sending an association request to a server based on the playback identifier, to enable the server to establish an association between a terminal and the multimedia playback device; receiving a plurality of candidate options pushed by the server, the plurality of candidate options being triggered to be pushed when the server detects that a preset time point arrives after the multimedia playback device plays back a first media resource; and obtaining a target option selected by a user from the plurality of candidate options, and feeding back the target option to the server, to enable the server to determine, according to the target option selected by the user, a second media resource to be played back by the multimedia playback device. Such method not only allows at least one user to participate in an interaction of a multimedia playback, to increase a sense of participation of the user in the multimedia playback, but also improves resource utilization of the server and the terminal device.

Referring to FIG. 5, FIG. 5 is a diagram of information exchange according to an embodiment of this application. As shown in this figure, the system architecture includes a background server, a multimedia playback device, and a client (terminal).

1. The multimedia playback device sends a playback request to the server, and performs time calibration.

2. The server allocates a globally unique playback identifier playback id to the multimedia playback device.

3. The server provides a corresponding playback instruction and interaction instruction (including information such as an interaction time and content of an interaction option) to the multimedia playback device. After obtaining all the related information, the multimedia playback device formally starts playing back, and generates the playback id into a two-dimensional barcode and displays the two-dimensional barcode on a playback interface.

4. A viewer scans the two-dimensional barcode by using the terminal to obtain the playback id of this playback.

5. The terminal sends an association request to the server, to request to match a movie that is played back by the multimedia playback device this time, and performs time calibration.

6. The server updates the related information such as interaction content and interaction time of the movie to the client of the terminal in real time.

7. The multimedia playback device and the terminal that are successfully matched and that successfully perform time calibration synchronously display the interaction options. In this case, the viewer may participate in interaction selection by using the client of the terminal, and selection information is fed back to the server.

8. The multimedia playback device obtains feeding back result statistics of all the viewers in real time, and displays a statistics result.

Except time calibration and voting operations, in most cases, a terminal interface in the server can increase the number of the terminals without needing additional calculations. Therefore, as long as being permitted by a background bandwidth, in terms of calculations, an unlimited number of terminals are allowed to match. This feature is quite applicable to an interaction solution in a situation (for example, an annual gala, an evening party, or a theater) in which a plurality of people participates.

The following describes the server and the client (terminal) provided in the embodiments of this application in details with reference to FIG. 6 to FIG. 11.

Figure 6:
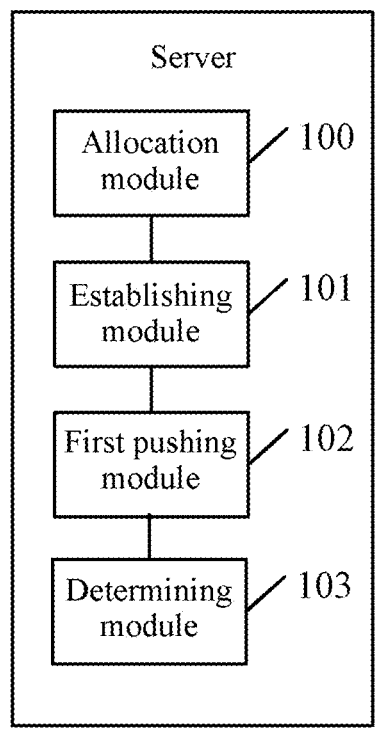
FIG. 6 illustrates an example of a schematic structural diagram of a server according to an embodiment of this application.

Referring to FIG. 6, FIG. 6 is a schematic structural diagram of a server according to an embodiment of this application. As shown in this figure, the server includes an allocation module 100, an establishing module 101, a first pushing module 102, and a determining module 103.

The allocation module 100 is configured to allocate a playback identifier to a multimedia playback device.

In this embodiment of this application, the allocation module 100 of the server allocates a playback identifier for each playback of the multimedia playback device, and the playback identifier is used to uniquely identify a first media resource that currently needs to be played back by the multimedia playback device. It needs to be noted that the playback identifier may be generated in real time, and is uniquely determined according to the multimedia playback device and the first media resource that is currently played back. That is, when a same media resource is played back on different multimedia playback devices, generated playback identifiers are different; and when a same multimedia playback device plays back different media resources, generated playback identifiers are also different. When the playback identifier is learned, the first media resource that is currently played back by the multimedia playback device may be located. The playback identifier is a globally unique identifier, and may be obtained according to a preset algorithm.

Figure 8:
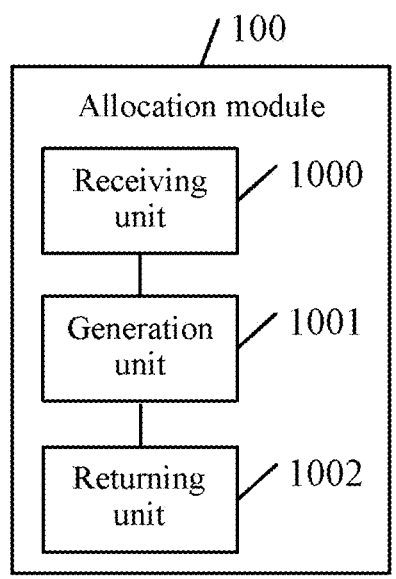
FIG. 8 illustrates an example of a schematic structural diagram of an allocation module according to an embodiment of this application.

In some embodiments, as shown in FIG. 8, the allocation module 100 may include a receiving unit 1000, a generation unit 1001, and a returning unit 1002.

The receiving unit 1000 is configured to receive a multimedia playback request sent by the multimedia playback device.

The generation unit 1001 is configured to generate the playback identifier for the multimedia playback device in real time according to the multimedia playback request.

The returning unit 1002 is configured to return the playback identifier to the multimedia playback device.

In this embodiment of this application, when starting playing back a new media resource each time, the multimedia playback device submits the multimedia playback request to the server, and performs time synchronization with the server. In some embodiments, the multimedia playback request carries an identifier (for example, a name of a movie) of a first media resource to be played back by the multimedia playback device and an identifier of the multimedia playback device. After receiving the multimedia playback request, the server returns a globally unique playback identifier playback id according to the multimedia playback request, and the playback identifier playback id may be obtained in real time according to a preset algorithm.

Further, in some embodiments, the server simultaneously provides a corresponding playback instruction (including the first media resource to be played back by the multimedia playback device) and an interaction instruction (including a preset time point for interacting with a plurality of users, and a plurality of candidate options associated with the preset time point) for the multimedia playback device.

After obtaining all the related instructions, the multimedia playback device formally starts playing back. In some embodiments, the multimedia playback device also generates the playback id into a two-dimensional barcode, and displays the two-dimensional barcode on a playback interface. Each user may hand-hold the terminal to scan the two-dimensional barcode, to obtain the playback identifier. It may be understood that the playback identifier may alternatively be notified to each user in another manner. For example, when the playback identifier is a string of characters, the playback identifier is broadcast by using a language. This is not limited herein.

The establishing module 101 is configured to: receive an association request initiated by at least one terminal according to the playback identifier, and establish an association between the multimedia playback device and the at least one terminal.

In this embodiment of this application, after each terminal learned the playback identifier, to establish a matching association relationship with the playback device, each terminal sends the association request to the server according to the playback identifier, and performs time calibration with the server. The server receives the association request sent by the at least one terminal and parses out the playback identifier in the association request. The establishing module 101 establishes the association between the multimedia playback device and the at least one terminal according to the playback identifier, that is, establishes a virtual connection between the multimedia playback device and the at least one terminal according to the playback identifier, so as to synchronize the multimedia playback device with the at least one terminal.

The first pushing module 102 is configured to synchronously push, when it is detected that a preset time point arrives after the multimedia playback device plays back the first media resource, a plurality of candidate options to the at least one terminal.

In this embodiment of this application, when the preset time point arrives after the multimedia playback device plays back the first media resource, an interaction opportunity is given to the users, that is, a plurality of users mutually selects a media resource to be played back next.

Specifically, in some embodiments, when the server detects that the preset time point arrives, to synchronize the multimedia playback device with the at least one terminal, the first pushing module 102 of the server synchronously pushes the plurality of candidate options to the at least one terminal. In some embodiments, when the preset time point arrives, the multimedia playback device also displays the plurality of candidate options. In a process of viewing the first media resource, when viewing that the multimedia playback device displays the plurality of candidate options, the user performs a selection operation on the terminal. As shown in FIG. 5, the multimedia playback device displays three candidate options, namely, "option 1", "option 2" and "option 3", and a matched terminal (mobile phone) also synchronously displays the three options.

The plurality of candidate options is options that are provided to the user to determine a media resource to be played back next by the multimedia playback device, and one candidate option corresponds to one preset media resource. For example, the first media resource is a fragment of a movie, and the fragment describes that "C selects to save who when A and B fall into the water", and then two candidate options, namely, "save A" and "save B" are generated. The two candidate options respectively correspond to different stories. Therefore, when a different target option is selected, a second media resource to be played back by the multimedia playback device is different.

The determining module 103 is configured to: obtain a target option selected by each terminal in the at least one terminal from the plurality of candidate options, and determine, according to the target option, a second media resource to be played back by the multimedia playback device.

In this embodiment of this application, after each terminal in the at least one terminal receives the plurality of candidate options, the user may perform selection on the plurality of candidate options on the terminal, and return the selected target option to the server. The determining module 103 of the server obtains the target option fed back by each terminal in the at least one terminal, and determines, according to the target option, the second media resource to be played back by the multimedia playback device. It needs to be noted that the second media resource may be associated with the first media resource, or may not be associated with the first media resource.

Figure 7:
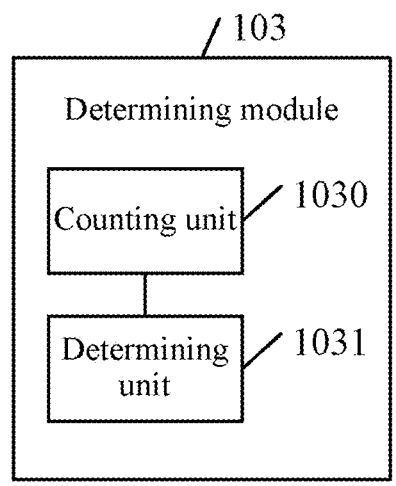
FIG. 7 illustrates an example of a schematic structural diagram of a determining module according to an embodiment of this application.

In some embodiments. as shown in FIG. 7, the determining module 103 may include a counting unit 1030 and a determining unit 1031.

The counting unit 1030 is configured to: obtain the target option selected by each terminal in the at least one terminal from the plurality of candidate options, and count a selection percentage of each candidate option in the plurality of candidate options according to the target option selected by each terminal in the at least one terminal.

Specifically, when an interaction time arrives, the counting unit 1030 of the server may count a selection percentage of each candidate option in the plurality of candidate options according to the target option selected by each terminal. For example, ten terminals in total are matched and associated with the multimedia playback device, three terminals select the option 1, two terminals select the option 2, and five terminals select the option 3, and then a selection percentage of the option 1 is 30%, a selection percentage of the option 2 is 20%, and a selection percentage of the option 3 is 50%.

The determining unit 1031 is configured to determine a preset media resource corresponding to a target option with the highest selection percentage in the plurality of candidate options as the second media resource to be played back by the multimedia playback device, one candidate option corresponding to one preset media resource.

Specifically, the determining unit 1031 determines the preset media resource corresponding to the candidate option with the highest selection percentage in the plurality of candidate options as the second media resource to be played back by the multimedia playback device. Generally, one candidate option corresponds to one preset media resource. The foregoing options are still used as an example for description. The percentage of the option 3 is the highest in the three options, that is, a preset media resource corresponding to the option 3 is used as the second media resource to be played back.

Further, in some embodiments, the server may further include a second pushing module.

The second pushing module is configured to push the selection percentage of each candidate option in the plurality of candidate options and the second media resource to the multimedia playback device.

In this embodiment of this application, to enable the viewers to obtain an overall percentage situation, the server pushes the selection percentage of each candidate option to the multimedia playback device, and the multimedia playback device displays the percentage. As shown in FIG. 6, FIG. 6 is a schematic diagram of a selection percentage of each candidate option displayed by the multimedia playback device. In addition, the server pushes the second media resource to be played back by the multimedia playback device to the multimedia playback device. The second media resource is determined according to the target option and then the second media resource is pushed to the multimedia playback device, so that a data buffer size of the multimedia playback device may be reduced.

It may be understood that as long as a buffer of the multimedia playback device is large enough, all the preset media resources corresponding to the foregoing candidate options may alternatively be pushed to the multimedia playback device in advance. When determining the second media resource to be played back, the server may send a resource identifier of the second media resource to the multimedia playback device, and the multimedia playback device plays back the second media resource according to the resource identifier.

In addition, if the server does not receive the association request sent by any terminal, that is, no user participates in the interaction process, after playing back the first media resource, the multimedia playback device uses a preset default media resource as the media resource to be played back next by the multimedia playback device, and pushes the default media resource to the multimedia playback device for playing back.

In addition, if the server receives the association request sent by at least one terminal, but the server does not receive, in an interaction time period starting form the preset time point, the target option that is sent by any terminal and that is determined for the plurality of candidate options, that is, a user performs association matching by using the terminal, but no user performs the selection operation on the terminal, after playing back the first media resource, the multimedia playback device uses the preset default media resource as the media resource to be played back next by the multimedia playback device, and pushes the default media resource to the multimedia playback device for playing back.

This embodiment of this application includes: allocating a playback identifier to a multimedia playback device; receiving an association request initiated by at least one terminal according to the playback identifier, and establishing an association between the multimedia playback device and the at least one terminal; pushing, when it is detected that a preset time point arrives after the multimedia playback device plays back a first media resource, a plurality of candidate options to the at least one terminal; and obtaining a target option selected by the at least one terminal from the plurality of candidate options, and determining, according to the target option, a second media resource to be played back by the multimedia playback device. Such method may allow at least one user to participate in an interaction of a multimedia playback, to increase a sense of participation of the user in the multimedia playback.

Figure 9:
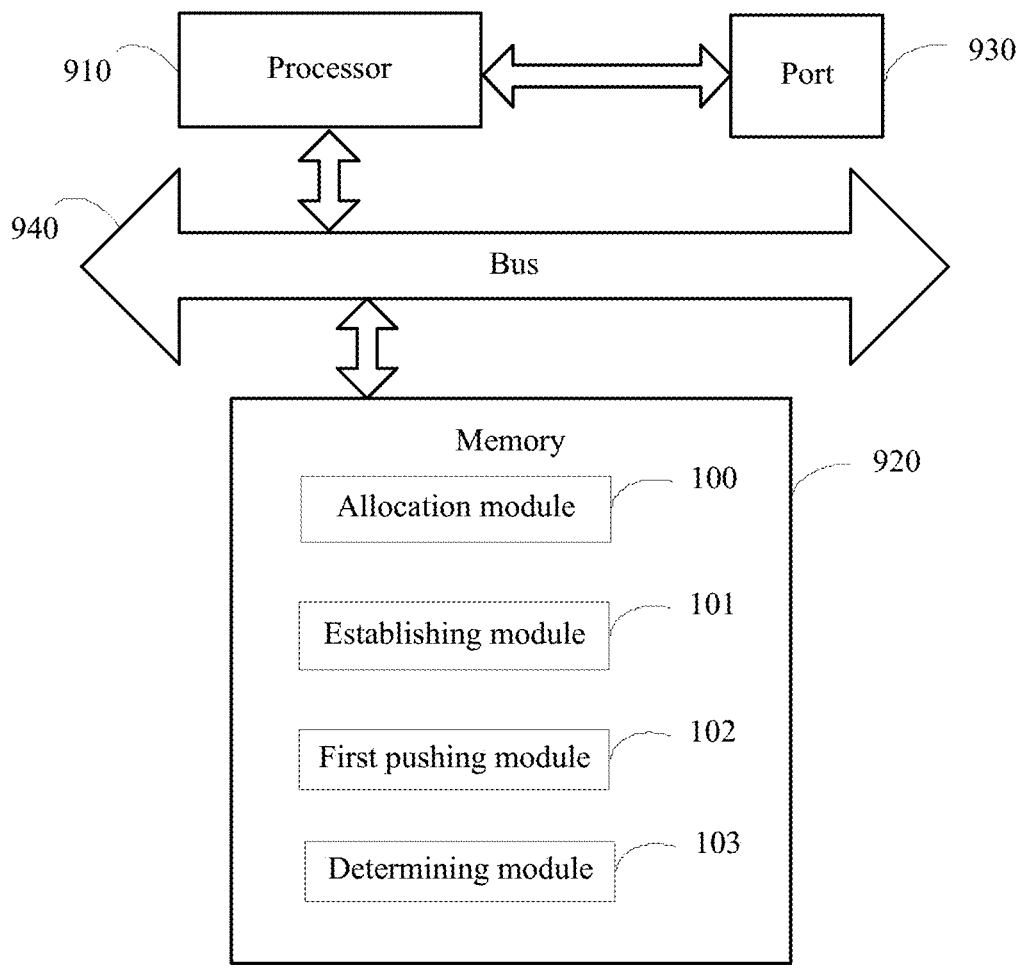
FIG. 9 illustrates an example of a schematic structural diagram of hardware of a server according to an embodiment of this application.

In some embodiments, the server may run in any computer device (for example, a computer device including a display interface) that can perform a media display, and load in a memory of the computer device. The memory may include a random access memory (RAM) and/or a nonvolatile memory. As shown in FIG. 9, besides the modules 100 to 103 in the server, the computer device may further include: a memory 920, a processor 910, a bus 940, and a port 930. The processor 910 and the memory 920 are interconnected by using the bus 940. The processor 910 may receive and send data by using the port 930, to implement network communications and/or local communications. The modules 100 to 103 may be machine-executable instruction modules stored in the memory 920. The processor 910 can perform functions of the foregoing modules 100 to 103 by means of executing executable instructions included in the modules 100 to 103 in the memory 920.

Specifically, in some embodiments of this application, the memory 920 stores one or more programs configured to be executed by one or more processors 910.

The one or more programs may include the following instruction modules.

An allocation module 100 is configured to allocate a playback identifier to a multimedia playback device.

An establishing module 101 is configured to: receive an association request initiated by at least one terminal according to the playback identifier, and establish an association between the multimedia playback device and the at least one terminal.

A first pushing module 102 is configured to synchronously push, when it is detected that a preset time point arrives after the multimedia playback device plays back a first media resource, a plurality of candidate options to the at least one terminal.

A determining module 103 is configured to: obtain a target option selected by each terminal in the at least one terminal from the plurality of candidate options, and determine, according to the target option, a second media resource to be played back by the multimedia playback device.

The server may be implemented in many ways. In one example, the processor 910 may also be in communication with additional elements, such as the network interface and/or other interfaces such as the port 930 and/or the bus 940. Examples of the processor 910 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 910 may be one or more devices operable to execute logic. The logic may include computer executable instructions or computer code stored in the memory 920 or in other memory that when executed by the processor 910, cause the processor 910 to perform the features implemented by the logic the server or methods described herein. The computer code may include instructions executable with the processor 910.

The memory 920 may be any device for storing and retrieving data or any combination thereof. The memory 920 may include non-volatile and/or volatile memory, such as a random access memory (RAM), a read-only memory (ROM), an erasable programmable read-only memory (EPROM), or flash memory. Alternatively or in addition, the memory 920 may include an optical, magnetic (hard-drive) or any other form of data storage device.

In some examples, each component or module of the server 1000 may include a circuit or circuitry. Each circuit or circuitry may be hardware or a combination of hardware and software. The circuitry may include the modules 100 to 103, the server, and/or other components and subcomponents of the server described herein. Accordingly, the term module may be used interchangeably with the term module circuitry or circuitry. In some examples, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 920, for example, that comprises instructions executable with the processor 910 or other processor to implement one or more of the features of the circuitry. When any one of the circuitry includes the portion of the memory that comprises instructions executable with the processor 910, the circuitry may or may not include the processor 910. In some examples, each circuitry may just be the portion of the memory 920 or other physical memory that comprises instructions executable with the processor 910 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the server and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the server may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

Figure 10:
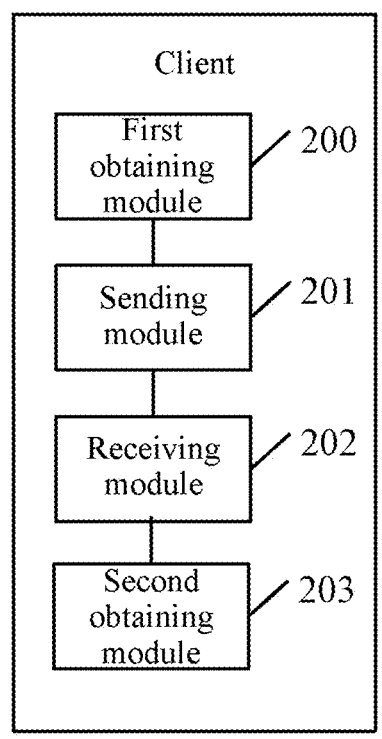
FIG. 10 illustrates an example of a schematic structural diagram of a terminal device according to an embodiment of this application.

Referring to FIG. 10, FIG. 10 is a schematic structural diagram of a client according to an embodiment of this application. As shown in this figure, the client is applied to a terminal. As shown in this figure, the client includes: a first obtaining module 200, a sending module 201, a receiving module 202, and a second obtaining module 203.

The first obtaining module 200 is configured to obtain a playback identifier of a multimedia playback device.

In this embodiment of this application, the first obtaining module 200 of the client of the terminal obtains the playback identifier of the multimedia playback device. Specifically, in some embodiments, an obtaining method may include a plurality of methods. For example, the user may scan a graphic code including the playback identifier by using the terminal, and parses the graphic code to obtain the playback identifier of the multimedia playback device. The graphic code may be generated by the multimedia playback device according to the playback identifier, and is displayed on a playback interface.

The sending module 201 is configured to send an association request to a server based on the playback identifier, to enable the server to establish an association between the terminal and the multimedia playback device.

In this embodiment of this application, the terminal sends the association request to the server based on the playback identifier, and performs time synchronization with the server. After receiving the association request, the server parses out the playback identifier, so as to establish the association between the terminal and the multimedia playback device according to the playback identifier. The playback identifier is generated by means of requesting the server in advance by the multimedia playback device.

The receiving module 202 is configured to receive a plurality of candidate options pushed by the server, the plurality of candidate options being triggered to be pushed when the server detects that a preset time point arrives after the multimedia playback device plays back a first media resource.

In this embodiment of this application, when detecting that the preset time point arrives after the multimedia playback device plays back the first media resource, the server pushes the plurality of candidate options to the terminal. After receiving the plurality of candidate options, the terminal displays the plurality of candidate options, and a user may perform a selection operation on the plurality of candidate options. As shown in FIG. 5, the terminal displays "option 1", "option 2", and "option 3".

The second obtaining module 203 is configured to: obtain a target option selected by a user from the plurality of candidate options, and feed back the target option to the server, to enable the server to determine a second media resource to be played back by the multimedia playback device.

In this embodiment of this application, the terminal obtains the target option selected by the user, and feeds back the target option to the server by using a network connection. It needs to be noted that an interaction time is limited, and the user needs to select the target option before the interaction time arrives. The server may determine, according to the target option selected by each terminal, the second media resource to be played back. For a specific determining manner, refer to the embodiment description of FIG. 1, and details are not described herein again.

In some embodiments, the client may further include a display module.

The display module is configured to display the plurality of candidate options.

The second obtaining module 203 is specifically configured to: detect a touchscreen operation performed by a user on the plurality of candidate options, and determine, according to the touchscreen operation, the target option selected by the user.

Specifically, the terminal may be a touchscreen terminal. The user may perform selection on the plurality of candidate options by using a touchscreen operation, and the target option selected by the user is determined according to a position of the touchscreen operation.

It may be understood that the user may perform selection on the plurality of candidate options in a key input manner or a mouse input manner.

This embodiment of this application includes: obtaining a playback identifier of a multimedia playback device; sending an association request to a server based on the playback identifier, to enable the server to establish an association between a terminal and the multimedia playback device; receiving a plurality of candidate options pushed by the server, the plurality of candidate options being triggered to be pushed when the server detects that a preset time point arrives after the multimedia playback device plays back a first media resource; and obtaining a target option selected by a user from the plurality of candidate options, and feeding back the target option to the server, to enable the server to determine, according to the target option selected by the user, a second media resource to be played back by the multimedia playback device. Such method not only allows at least one user to participate in an interaction of a multimedia playback, to increase a sense of participation of the user in the multimedia playback, but also improves resource utilization of the server and the terminal device.

Figure 11:
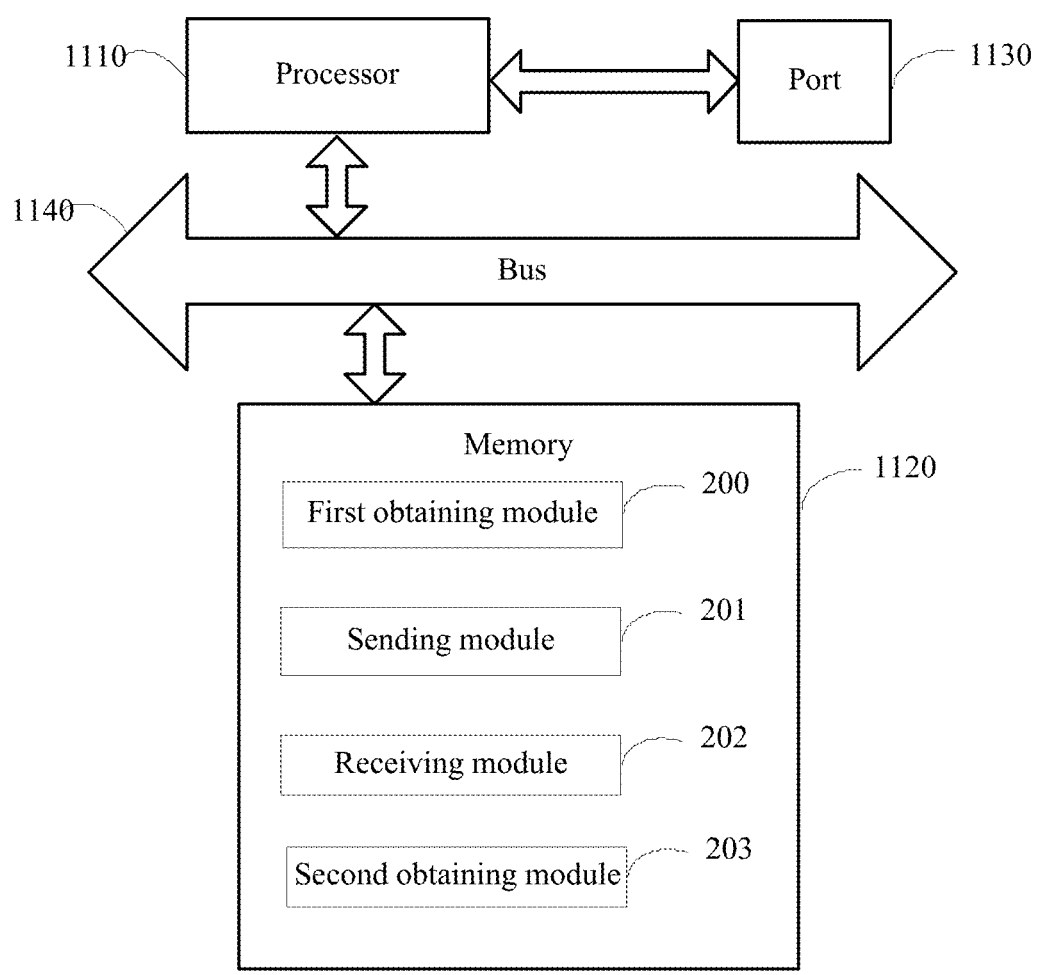
FIG. 11 illustrates an example of a schematic structural diagram of hardware of a terminal device according to an embodiment of this application.

In some embodiments, the client may run in any computer device (for example, a computer device including a display interface) that can perform a media display, and load in a memory of the computer device. The memory may include a RAM and/or a nonvolatile memory. As shown in FIG. 11, besides the modules 200 to 203 in the client, the computer device may further include: a memory 1120, a processor 1110, a bus 1140, and a port 1130. The processor 1110 and the memory 1120 are interconnected by using the bus 1140. The processor 1110 may receive and send data by using the port 1130, to implement network communications and/or local communications. The modules 200 to 203 may be machine-executable instruction modules stored in the memory 1120. The processor 1110 can perform functions of the foregoing modules 200 to 203 by means of executing executable instructions included in the modules 200 to 203 in the memory 1120.

Specifically, in some embodiments of this application, the memory 920 stores one or more programs configured to be executed by one or more processors 910.

The one or more programs may include the following instruction modules.

A first obtaining module 200 is configured to obtain a playback identifier of a multimedia playback device.

A sending module 201 is configured to send an association request to a server based on the playback identifier, to enable the server to establish an association between the terminal and the multimedia playback device.

A receiving module 202 is configured to receive a plurality of candidate options pushed by the server, the plurality of candidate options being triggered to be pushed when the server detects that a preset time point arrives after the multimedia playback device plays back a first media resource.

A second obtaining module 203 is configured to: obtain a target option selected by a user from the plurality of candidate options, and feed back the target option to the server, to enable the server to determine a second media resource to be played back by the multimedia playback device.

The terminal may be implemented in many ways. In one example, the processor 1110 may also be in communication with additional elements, such as the network interface and/or other interfaces such as the port 1130 and/or the bus 1140. Examples of the processor 1110 may include a general processor, a central processing unit, a microcontroller, a terminal, an application specific integrated circuit (ASIC), a digital signal processor, a field programmable gate array (FPGA), and/or a digital circuit, analog circuit, or some combination thereof.

The processor 1110 may be one or more devices operable to execute logic. The logic may include computer executable instructions or computer code stored in the memory 1120 or in other memory that when executed by the processor 1110, cause the processor 1110 to perform the features implemented by the logic the terminal or methods described herein. The computer code may include instructions executable with the processor 1110.

The memory 1120 may be any device for storing and retrieving data or any combination thereof. The memory 1120 may include non-volatile and/or volatile memory, such as a random access memory (RAM), a read-only memory (ROM), an erasable programmable read-only memory (EPROM), or flash memory. Alternatively or in addition, the memory 1120 may include an optical, magnetic (hard-drive) or any other form of data storage device.

In some examples, each component or module of the terminal may include a circuit or circuitry. Each circuit or circuitry may be hardware or a combination of hardware and software. The circuitry may include the first obtaining module 200, the second module 201, the receiving module 202, the obtaining module 203, the terminal, and/or other components and subcomponents of the terminal described herein. Accordingly, the term module may be used interchangeably with the term module circuitry or circuitry. In some examples, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1120, for example, that comprises instructions executable with the processor 1110 or other processor to implement one or more of the features of the circuitry. When any one of the circuitry includes the portion of the memory that comprises instructions executable with the processor 1110, the circuitry may or may not include the processor 1110. In some examples, each circuitry may just be the portion of the memory 1120 or other physical memory that comprises instructions executable with the processor 1110 or other processor to implement the features of the corresponding circuitry without the circuitry including any other hardware. Because each circuitry includes at least some hardware even when the included hardware comprises software, each circuitry may be interchangeably referred to as a hardware circuitry.

Figure 12:
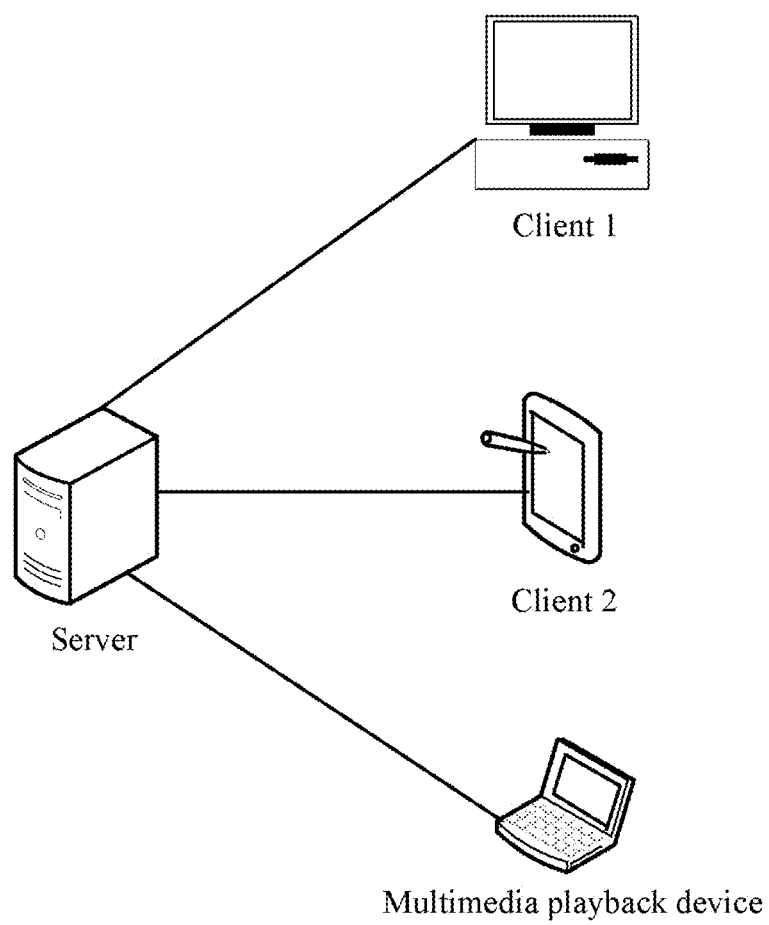
FIG. 12 illustrates an example of an architecture diagram of a multimedia playback system according to an embodiment of this application.

Some features are shown stored in a computer readable storage medium (for example, as logic implemented as computer executable instructions or as data structures in memory). All or part of the terminal and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. Referring to FIG. 12, FIG. 12 is an architecture diagram of a multimedia playback system according to an embodiment of this application. As shown in this figure, the system includes a server, a multimedia playback device, and at least one client.

For the server, refer to related descriptions of embodiments shown in FIG. 6 to FIG. 9. For the client, refer to related descriptions of embodiments shown in FIG. 10 to FIG. 11.

According to the descriptions of the foregoing embodiments, this embodiment of this application includes: allocating a playback identifier to a multimedia playback device; receiving an association request initiated by at least one terminal according to the playback identifier, and establishing an association between the multimedia playback device and the at least one terminal; pushing, when it is detected that a preset time point arrives after the multimedia playback device plays back a first media resource, a plurality of candidate options to the at least one terminal; and obtaining a target option selected by the at least one terminal from the plurality of candidate options, and determining, according to the target option, a second media resource to be played back by the multimedia playback device. Such method may allow at least one user to participate in an interaction of a multimedia playback, to increase a sense of participation of the user in the multimedia playback.

A person of ordinary skill in the art may understand that all or some of the processes in the methods of the foregoing embodiments may be performed by a computer program instructing relevant hardware, and the program may be stored in a computer readable storage medium. A program corresponding to the server shown in FIG. 6 to FIG. 9 may be stored in a readable storage medium of the server, and be executed by at least one processor in the server, to perform the foregoing multimedia playback method. A program corresponding to the client shown in FIG. 10 and FIG. 11 may be stored in a readable storage medium of the terminal, and be executed by at least one processor in the terminal, to perform the foregoing multimedia playback method. The storage medium may be: a magnetic disk, an optical disc, a read-only memory (ROM), a RAM, or the like.

Therefore, this application further provides a storage medium, which stores a data processing program. The data processing program is used for executing any embodiment of the foregoing method of this application.

What is disclosed above is merely example embodiments of this application, and certainly is not intended to limit the protection scope of this application. Therefore, equivalent variations made in accordance with the claims of this application shall fall within the scope of this application.

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and/or flash memory drives. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects. In a first aspect, a terminal may obtain a playback identifier of a multimedia playback device. The terminal may send an association request to a server based on the playback identifier. The association request may enable the server to establish an association between a terminal and the multimedia playback device. Terminal may receive a plurality of candidate options pushed by the server. The plurality of candidate options may be pushed to the terminal associated with the multimedia playback device when the server detects that a preset time point arrives after the multimedia playback device plays back a first media resource. The terminal may obtain a target option selected from the plurality of candidate options. Terminal may feedback the target option to the server to enable the server to determine a second media resource to be played back by the multimedia playback device.

In a second aspect, a server may allocate a playback identifier to a multimedia playback device. The server may receive an association request initiated by at least one terminal according to the playback identifier, and establishing an association between the multimedia playback device and the at least one terminal. The server may synchronously push, when it is detected that a preset time point arrives after the multimedia playback device plays back a first media resource, a plurality of candidate options to the at least one terminal associated with the multimedia playback device. The server may obtain a target option selected by the at least one terminal from the plurality of candidate options, and determining, according to the target option, a second media resource to be played back by the multimedia playback device.

What is claimed is:

1. A multimedia playback method, the method comprising:
receiving, by a server, a message generated by a multimedia playback device, the message comprising an identifier of the multimedia playback device and an identifier of a first media resource accessible by the multimedia playback device for playback on the multimedia playback device;
generating, by the server, a playback identifier in response to receipt of the message, the playback identifier uniquely identifying a mapping between the identifier of the multimedia playback device and the identifier of the first media resource;
communicating, by the server, the playback identifier to the multimedia playback device;
receiving, by the server, an association request identifying the playback identifier from a terminal device that wants to display a plurality of candidate options for further playback by the multimedia playback device;

in response to receiving the association request, establishing, by the server, a time synchronization with the terminal device and the multimedia playback device that configures the server to transmit the plurality of candidate options to the terminal device according to playback of the first media resource by the multimedia playback device reaching a preset time point;
in response to establishing the time synchronization, transmitting, by the server, the plurality of candidate options to the terminal device to cause the terminal device to synchronously display the plurality of candidate options with playback of the first media resource reaching the preset time point; and
determining, by the server, a second media resource to be played back by the multimedia playback device in response to receipt of a selected target option of the plurality of candidate options by the terminal device.

2. The multimedia playback method of claim 1, wherein after receiving the plurality of candidate options from the server, the method further comprises:
displaying, by the terminal device, the plurality of candidate options;
detecting, by the terminal device, an interactive operation corresponding to at least one of the candidate options; and
selecting, by the terminal device, based on the interactive operation, the target option from the plurality of candidate options.

3. The multimedia playback method of claim 2, further comprising:
Increasing, by the server, a rank of, in response to detection of the interactive operation, the at least one of the candidate options; and
redisplaying, by the server, the candidate options based on the increased rank.

4. The multimedia playback method of claim 1, wherein obtaining the playback identifier of the multimedia playback device further comprises:
scanning, by the terminal device, a graphic code comprising the playback identifier of the multimedia playback device; and
parsing, by the terminal device, the graphic code to obtain the playback identifier of the multimedia playback device.

5. The multimedia playback method of claim 1, wherein the multimedia playback device is an internet video playback device, and the terminal device is a mobile device configured to display a video played back by the multimedia playback device.

6. The multimedia playback method of claim 1, wherein determining, according to the target option, the second media resource for playback by the multimedia playback device further comprises:
determining, by the server, a plurality of respective selection metrics for previously selected target options, each of the respective selection metrics comprising a number of selection times for a corresponding selected target option proportional to a total number of selections for all of the previously selected target options,
identifying, by the server, a previously selected target option corresponding to a highest one of the respective selection metrics; and
determining, by the server, a preset media resource corresponding to the previously selected target option as the second media resource for playback by the multimedia playback device.

7. The multimedia playback method of claim 6, further comprising:
pushing, by the server, the respective selection metrics and the second media resource to the multimedia playback device.

8. The multimedia playback method of claim 1, further comprising:
obtaining, by the server, based on a target identifier, the preset time point and the plurality of candidate options associated with the preset time point; and
pushing, by the server, the preset time point and the plurality of candidate options associated with the preset time point to the multimedia playback device, the multimedia playback device configured to display the plurality of candidate options based the preset time point after the multimedia playback device begins playback of the first media resource.

9. The multimedia playback method of claim 1, further comprising:
transmitting, by the server, to a plurality of terminal devices, graphical indicators for the candidate options, the graphical indicators indicative of a corresponding rank for each candidate option;
receiving, by the server, a plurality of interactive operations from a plurality of terminal devices, each interactive operation associated with a corresponding one of the graphical indicators;
adjusting, by the server, the corresponding rank for at least one of the candidate options;
causing, by the server, redisplay of the candidate options based on the adjusted corresponding rank for the at least one of the candidate options; and
selecting, by the server, the candidate option with a highest rank as the target option.

10. A system comprising:
a server and a terminal, the server configured to:
receive a message generated by a multimedia playback device, the message comprising an identifier of the multimedia playback device and an identifier of a first media resource accessible by the multimedia playback device for playback on the multimedia playback device;
generate a playback identifier in response to receipt of the message, the playback identifier uniquely identifying a mapping between the identifier of the multimedia playback device and the identifier of the first media resource;
communicate the playback identifier to the multimedia playback device;
receive an association request identifying the playback identifier from the terminal, the association request requesting a plurality of candidate options for further playback by the multimedia playback device;
in response to receipt of the association request, establish a time synchronization with the terminal and the multimedia playback device that configures the server to transmit the plurality of candidate options to the terminal according to playback of the first media resource reaching a preset time point; and
in response to establishment of the time synchronization, transmit, by the server, the plurality of candidate options to the terminal to cause the terminal to synchronously display the plurality of candidate options with playback of the first media resource reaching the preset time point; and
the terminal configured to:
obtain the playback identifier;
communicate the association request to the server based on the playback identifier;
in response to establishment of the time synchronization, synchronously display the plurality of candidate options with playback of the first media resource by the multimedia playback device reaching the preset time point;
obtain a target option selected from the plurality of candidate options; and
communicate the target option to the server, the target option configured to cause the server to determine a second media resource to be played back by the multimedia playback device.

11. The system of claim 10, wherein the terminal is further configured to:
display the plurality of candidate options;
detect an interactive operation corresponding to at least one of the candidate options; and
select, based on the interactive operation, the target option.

12. The system of claim 10, wherein to obtain the playback identifier of the multimedia playback device, the terminal is further configured to:
scan a graphic code comprising the playback identifier of the multimedia playback device; and
parse the graphic code to obtain the playback identifier of the multimedia playback device.

13. The system of claim 10, wherein the server is further configured to:
transmit, to a plurality of terminals, graphical indicators for the candidate options, the graphical indicators indicative of a corresponding rank for each candidate option;
receive a plurality of interactive operations from a plurality of terminals, each interactive operation associated with a corresponding one of the graphical indicators;
adjust the corresponding rank for at least one of the candidate options;
cause redisplay of the candidate options based on the adjusted corresponding rank for the at least one of the candidate options; and
select the candidate option with a highest rank as the target option.

14. A system comprising:
a processor, the processor configured to:
receive a message generated by a multimedia playback device, the message comprising an identifier of the multimedia playback device and an identifier of a first media resource accessible by the multimedia playback device for playback on the multimedia playback device;
generate a playback identifier in response to receipt of the message, the playback identifier uniquely identifying a mapping between the identifier of the multimedia playback device and the identifier of the first media resource;
communicate the playback identifier to the multimedia playback device;
receive an association request initiated by a terminal according to the playback identifier, the association request identifying the playback identifier, the association request sent by the terminal to receive a plurality of candidate options for further playback by the multimedia playback device;
establish, in response to receipt of the association request, a time synchronization with the multimedia playback device and the terminal that configures the processor to transmit the plurality of options to the terminal device according to playback of the first media resource by the multimedia playback device reaching a preset time point;

in response to establishment of the time synchronization, synchronously push, to the terminal, a plurality of candidate options with playback of the first media resource by the multimedia playback device reaching the preset time point to cause the terminal to synchronously display the plurality of candidate options;

obtain a target option selected by the terminal from the plurality of candidate options; and determine, based on the target option, a second media resource to be played back by the multimedia playback device.

15. The system of claim 14, wherein to determine, according to the target option, the second media resource to be played back by the multimedia playback device, the processor is further configured to:

determine a plurality of respective selection metrics for previously selected target options, each of the selection metrics comprising a number of selection times for a corresponding selected target option proportional to a total number of selections for all of the previously selected target options;

identify a previously selected target option corresponding to the highest one of the respective selection metrics; and determine a media resource corresponding to the previously selected target option as the second media resource to be played back by the multimedia playback device.

16. The system of claim 15, wherein the processor is further configured to:

push the respective selection metrics and the second media resource to the multimedia playback device.

* * * * *